Figure 7:
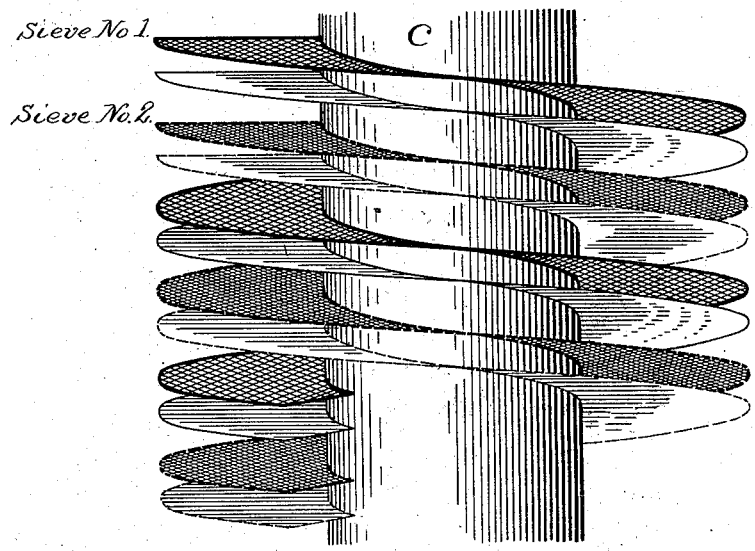

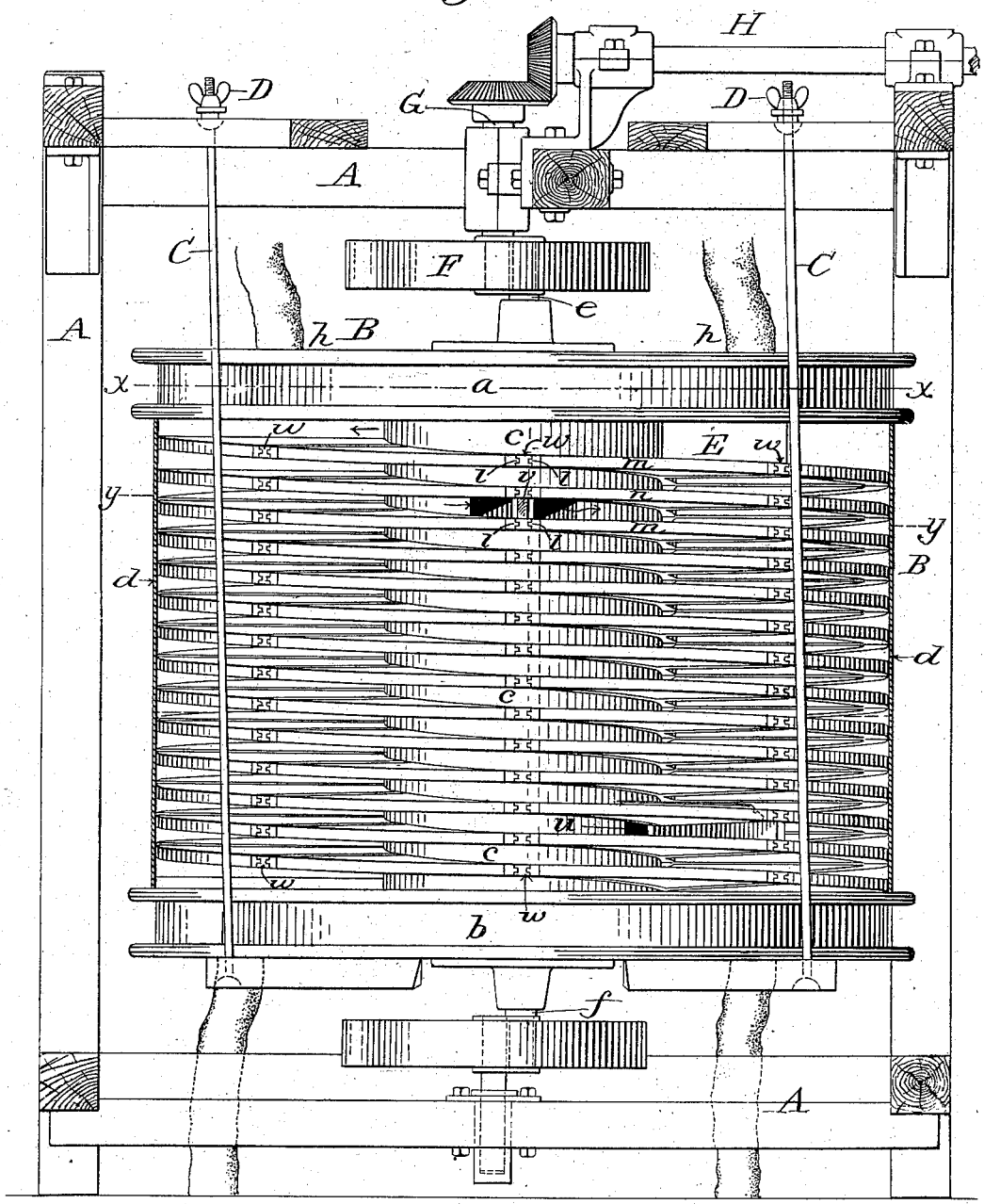

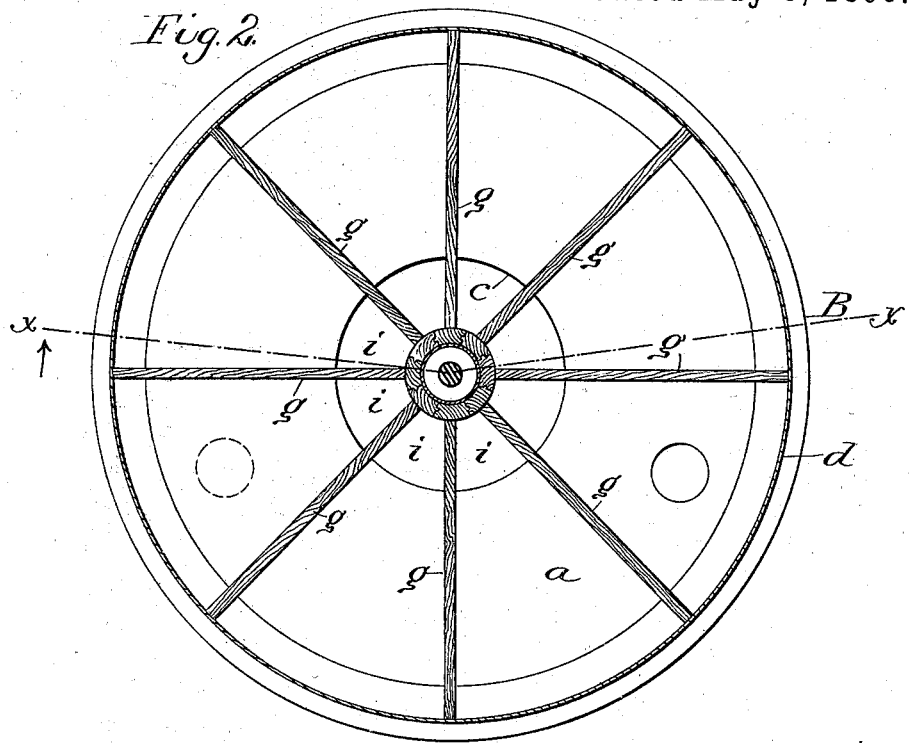
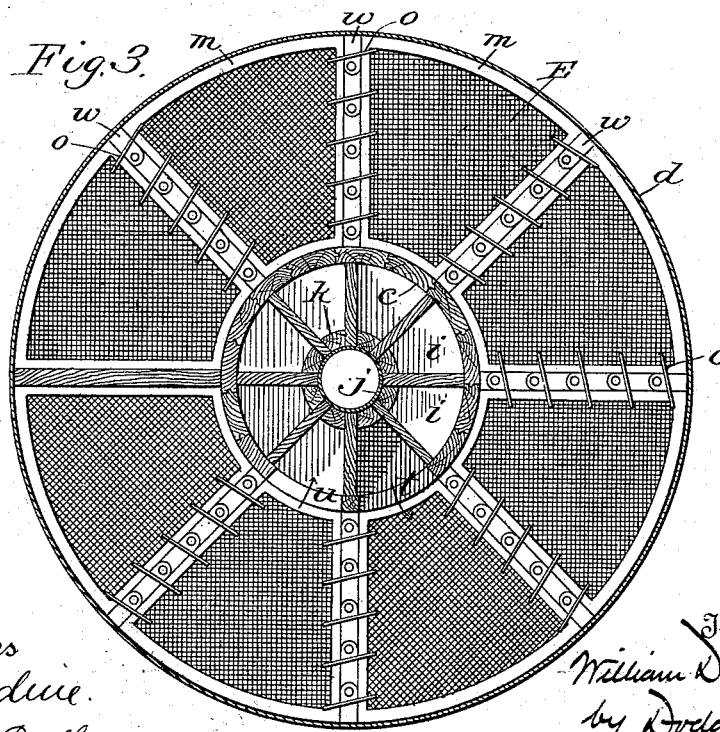

(No Model.) 5 Sheets—Sheet 3.
W. D. GRAY.
SIFTING MACHINE.
No. 559,378. Patented May 5, 1896.
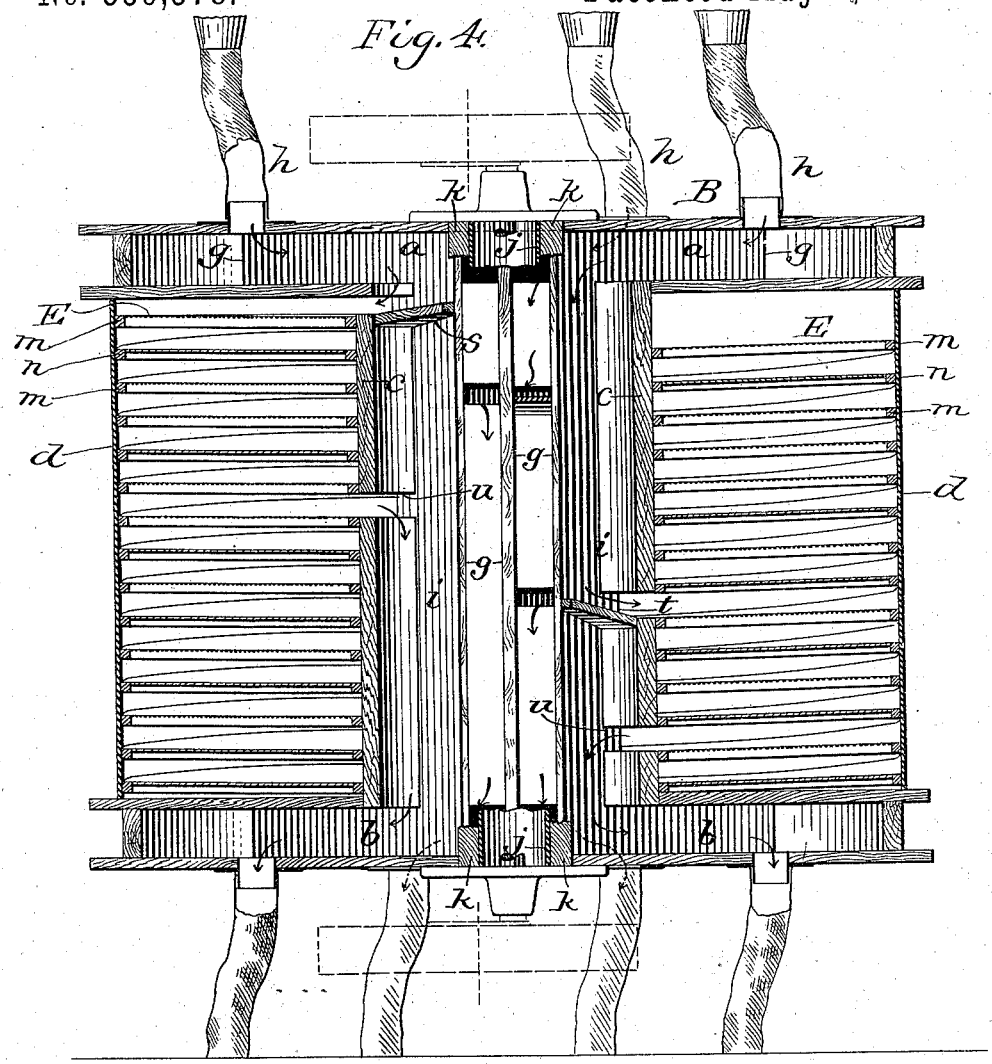
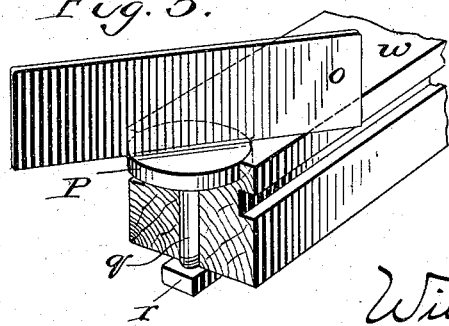
Witnesses
C. C. Burdine.
C. B. Bull.
Inventor:
William D. Gray,
by Dodge & Sons,
Attorneys

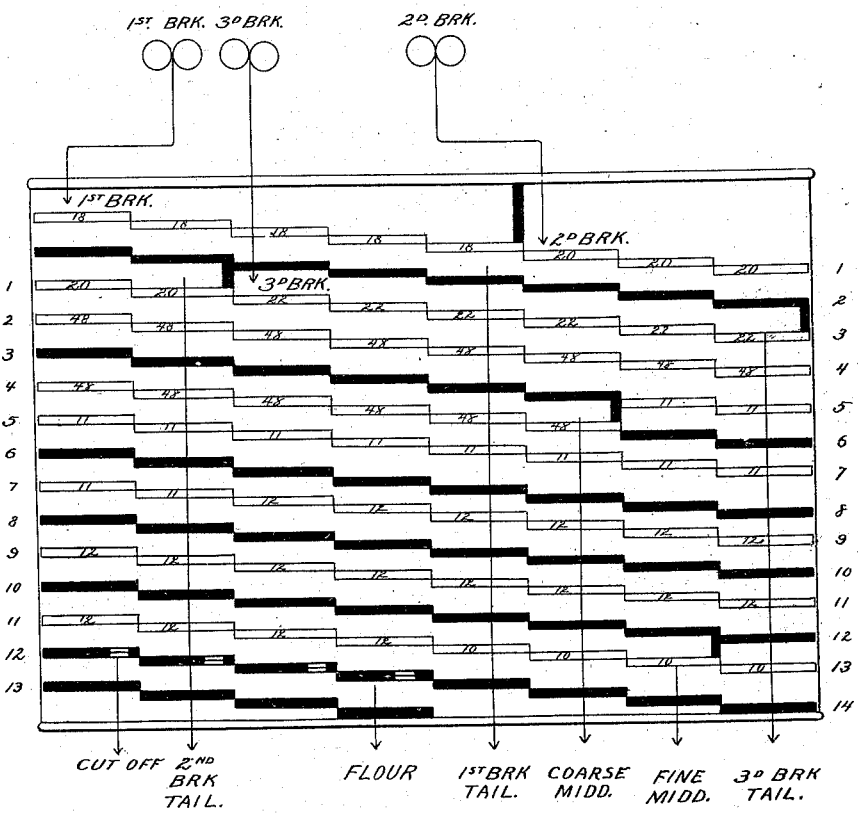

(No Model.)  
W. D. GRAY.  
SIFTING MACHINE.  
5 Sheets—Sheet 5.

No. 559,378. Patented May 5, 1896.

Sieve No 1.
Sieve No 2.

UNITED STATES PATENT OFFICE.

WILLIAM D. GRAY, OF MILWAUKEE, WISCONSIN, ASSIGNOR TO THE EDWARD P. ALLIS COMPANY, OF SAME PLACE.

SIFTING-MACHINE.

SPECIFICATION forming part of Letters Patent No. 559,378, dated May 5, 1896.

Application filed November 1, 1895. Serial No. 567,642. (No model.)

*To all whom it may concern:*

Be it known that I, WILLIAM D. GRAY, a citizen of the United States, residing at Milwaukee, in the county of Milwaukee and State of Wisconsin, have invented certain new and useful Improvements in Sifting-Machines, of which the following is a specification.

My invention pertains to that class of sifting and dressing machines for treating crushed or ground grain and like substances in which a sieve or a series of sieves is arranged in a spiral form about a vertical axis and provided with means for producing a horizontal swinging motion or travel about an eccentric axis without rotation about its own.

The invention consists in various novel features, details, and combinations hereinafter set forth whereby the machine is rendered compact and simple in construction, highly efficient in action, and capable of handling at one and the same time a number of different grades or classes of stock. The construction is such that different kinds or classes of material may be fed through a central drum or trunk, containing any required number of separate spouts or conduits, which may be so constructed as to deliver the several grades of stock or material to the surface of the sieve at any point or points desired and to receive the material from the top of the sieve, or after it has passed through the sieve and fallen upon the gather-boards, and convey or direct it to a divided discharge-box, from which each grade or product may be separately discharged or in which two or more different grades or products may be mingled, as desired by the operator.

In the accompanying drawings, Figure 1 is a side elevation of my improved machine with the casing or shell broken away to show the interior. Fig. 2 is a horizontal sectional view on the line *x x* of Fig. 1; Fig. 3, a similar section on the line *y y* of Fig. 1; Fig. 4, a vertical sectional view through the trunk at the center of the machine, showing its use for feeding and delivering material to and from the sieve or sieves; Fig. 5, a detail view of one of the flights hereinafter referred to; Fig. 6, a diagram or projection of the sieves and carriers, showing one of the various arrangements thereof and of the feed and delivery spouts or trunks; Fig. 7, a diagrammatic view illustrating the employment of two spiral sieves winding about the central column, one above the other.

The details of the machine may in many respects be varied without departing from the spirit or scope of my invention, it being optional, for instance, to suspend the apparatus from a ceiling or overhead support or within a special frame, or to carry it upon uprights stepped at their lower ends in fixed supports. These and other common features of construction may be varied as the circumstances of the case suggest.

In the drawings I have represented, and ordinarily I shall employ, a special frame for the machine, and it is preferred to suspend the casing rather than support it from below. Such a machine is represented in Fig. 1, in which A indicates a stout framework of any approved construction, within and from which is suspended a circular chest or body B by means of rods or hangers C, having ball-and-socket or other universal joints or bearings at their ends. Instead of these rods, straps, ropes, chains, or any equivalent hangers may be provided, though rods are preferred, and each rod will advisably be provided with an adjusting thumb-nut D, whereby the chest or body may be leveled or adjusted as required.

The chest B comprises a feed box or chamber *a* at the top, a delivery box or chamber *b* at the bottom, a tubular trunk *c*, connecting said boxes or chambers, and within which are the spouts or conduits through which the material treated is fed to and delivered from the sieve and gather-boards, one or more spiral sieves or series of sieves E, winding about the trunk *c*, correspondingly-arranged carriers beneath the sieves, and an external shell or casing *d* inclosing said parts. This casing may conveniently be made of sheet metal and will be removable as a whole or in sections, preferably the latter.

A horizontal swinging motion in a circular path is imparted to the chest B by the crank-pin *e* of a wheel F, which latter is secured to a vertical shaft G, journaled in suitable boxes or bearings on frame A, and receiving rotation through bevel-gearing from a horizontal shaft H, carried in boxes on frame A. Any other convenient drive may be adopted, provided only a crank-pin or eccentric be connected with the chest and have its axis concentric with that of the chest. A similar crank-pin or eccentric f will be arranged at the lower end of the chest, as shown, to insure a like movement of the top and bottom thereof. Being suspended or supported independently of the crank-pins or eccentrics, the chest moves easily and but little power is required to rotate the shaft G.

It is important to prevent any tendency toward rotation of the chest about its axis, as such motion would interfere more or less with the proper action of the machine and throw the hangers out of position. Hence the importance of placing the eccentrics or crank-pins with their axes coincident with that of the chest. It is also important to have the weight distributed as equally as practicable on all sides of the vertical axis for the same reason.

The feed-box a is merely a circular chamber divided by partitions g into as many compartments as may be desired, being in any case equal to the number of grades or classes of stock intended to be handled by the machine. In some cases, as where two or more spiral sieves or series of sieves are employed, it may be found expedient to increase the number of partitions and consequent compartments. Each compartment is provided with a feed-opening in its top which may be large enough to receive a feed-spout and permit play of the chest without disturbing such spout, or which may be furnished with a length of flexible feeding-spout h. The latter arrangement is preferred.

The partitions g are arranged radially and extend inward to and abut against a central pipe or tube j, concentric with the tubular trunk c, the partitions extending downward through trunk c, and the spaces between them forming vertical spouts or conduits i, through which material may be fed to and delivered from the sieve or sieves or any portion thereof, as indicated in Fig. 4. For the purpose of giving adequate strength and securing close joints, filling-pieces k are worked in between the partitions and against pipe j, thus forming a wooden tube or core about the metal pipe j. The delivery or discharge box b is or may be constructed in the same manner, the feed-box, discharge-box, and intermediate trunk with its partitions and core producing a very strong and rigid framework to support and carry the sieve or sieves and gather boards or carriers.

Projecting radially from trunk c are arms w, arranged at equal angular distances about the vertical axis of the trunk and varying in elevation progressively around the trunk, so that a line connecting them would describe a spiral or screw winding about the trunk. The arms are grooved in their side faces to receive tenons or tongues l of sieve-frames m or of carrier or gather boards n, both of which are of segmental shape and adapted to slide freely into the spaces between two arms. The arms being at slightly-different elevations, the sieve-frames and the gather boards or carriers will each incline slightly from the horizontal, and a continuous series of these frames or boards or frames and boards will produce a spiral plane similar to a deeply-cut screw-thread winding about trunk c.

The segmental shape of the sieve-frames and of the gather-boards causes them to fit snugly between the arms w and to fill the spaces completely, so that no crevices of any size are left in which material might lodge.

As there is naturally some tendency for the material to work outward to the circumference of the sieve, owing to centrifugal force, it will be found expedient in some cases to arrange the arms w with their outer ends slightly higher than their inner ends, thereby giving the sieve or sieves a slight inclination downward toward the trunk c. This inclination will be greater or less according to the dimensions of the machine and to the rapidity and amplitude of the revolutions of the crank-pin or eccentric by which it is actuated. The casing d would in any event prevent material from working over the circumference of the sieve, but there would be a tendency of the material to bank up against the casing in the absence of provision against it. Whether the sieve be thus inwardly inclined or not, it is desirable to provide means for shaking up the stock and more evenly distributing it over the surface of the sieve than would be the case were the entire sieve made smooth on its face. These objects I attain by means of flights or blades o, carried by the arms w, and rising vertically therefrom in planes deviating somewhat from right angles to the axes of the arms, as shown in Fig. 3. These flights may be most conveniently made of metal, and may be made adjustable to vary their angle of inclination to the bars k or fixed permanently in place, as deemed best. A convenient construction is illustrated in Fig. 5, where the flight is represented as consisting of the blade o, formed upon or secured to a circular disk p, having a stem q, threaded at its lower end to receive a fastening-nut r. A circular socket is bored in the arm w to receive the disk p and permit it to come flush with the upper face of said arm, and with a hole to receive the stem q, the parts being seated in position, as illustrated in Fig. 5, and made fast by nut r at any desired angle. Any equivalent means of application or adjustment may be adopted.

In practice I find it advantageous to arrange the flights a distance apart approximately equal to the throw of the crank-pin or eccentric which imparts motion to the machine, though I do not restrict myself to this or any other specific distance. As the stock passes over the sieve and between the flights they shake it up, turn it over, and cause such particles as might otherwise float or remain on top of the layer to fall through the surface of the sieve. Thus, if break-stock is being handled, any middlings which might float upon the top of the bran will be shaken out and brought down to the sieve. It is particularly to be noted that these flights do not propel the stock, nor do they retard its travel, their position being such as to have neither the one effect nor the other to any appreciable or material extent; but they serve in a measure to direct the material, and especially to distribute, shake up, and loosen the mass. Applied as shown they are found greatly to increase the capacity and efficiency of the machine.

It has been stated that the trunk $c$ is divided by partitions into compartments which constitute feed and discharge spouts or conduits. This feature of construction calls for further explanation, being in fact a very important characteristic of the machine. By reason of this construction I am enabled to carry the material to and from the sieves without any external spouts or conduits between its head and its base, and without carrying any spout, chute, or conduit through any of the sieves where their presence would interfere with the proper travel of material and reduce the sifting-surface. Upon referring to Fig. 4 the general plan of these feed chutes, spouts, or conduits will be readily understood, it being explained that the arrangement there shown is merely illustrative, and may be varied as desired.

At the left-hand side of trunk $c$ the compartment of the feed-box $a$, through which the section is taken, opens and delivers into a vertical spout or chute $i$, which is provided with a diaphragm $s$ a short distance below its top, and with a lateral opening $t$ just above this diaphragm, through which stock can pass to the sieve. At a lower point a second lateral opening $u$ is formed, through which material (tailings) may pass from the sieve into the lower part of the chute or conductor and thence to the discharge-box $b$, whence it will escape through a suitable outlet to a flexible spout, as indicated. A similar arrangement is illustrated at the right-hand side of the central trunk, with the difference only that the openings are at different levels.

In Fig. 1 $t$ indicates a feed or inlet opening and $u$ an outlet or discharge opening, between which is placed a radial board $v$. Such a board is used just below or after every discharge-opening and just above or before every feed-opening to separate the different materials upon the sieve on opposite sides of the board.

Fig. 6 is a plane projection or diagram, such as is prepared by mill-designers, illustrating one flow plan or order of separations, the numbers at the right and left indicating where the spirals would join, and the numbers on the blocks or sections indicating the grades of cloth employed for this particular flow plan. It is of course understood that there may be almost endless variations according to the views of the miller, class of grain handled, season of the year, atmospheric conditions, capacity of the mill, size of the machine, and the like.

Briefly following out the diagram, first break-stock falls upon the head of the long spiral sieve, is worked over five sections of No. 18 cloth, and the tailings there encounter a stop-board $v$, which terminates their travel and causes them to enter a passage of the central trunk, through which they fall to the first break-tailings compartment of discharge-box $b$. The screenings, consisting of flour and middlings in flour-milling, from these first five sections travel along the imperforate carrying or gather boards $n$, which are unnumbered in the diagram, and are carried over fourteen sections thereof, whence they are delivered upon sieve-sections clothed with No. 11 cloth. After passing over many sections of No. 11 cloth and about the same number of sections of No. 12 cloth, the tailings, being the middlings from this product, finally encounter stop-board $v$ near the foot of the sieve and are carried inward to the trunk to be delivered to the discharge-box. The material passing through the cloth, being the flour, is also carried to the trunk to be delivered to the discharge-box separately, if desired, or it may be mixed with the product of another break. The second and third break-stocks are handled in a similar manner, as will be readily understood upon referring to the diagram. Further explanation is deemed superfluous, since the course of each may be varied as desired.

By making the sieve of removable sections the cloth may be changed in a short time to suit the work in hand, and repairs may be quickly and easily made.

In the drawings I have shown and in the description I have referred to a sieve presenting a smooth or unbroken surface except as to the flights, and such a sieve is preferred for various reasons, yet this mode of feeding sieve-machines of this class may be adopted on any form of sieve where central feed and discharge are desirable. My invention is therefore not restricted to the smooth or continuous surface.

As indicated above, two or more spiral sieves winding about the central column one above another after the manner of a double or multiple threaded screw may be employed, and this feature is of very considerable importance for the reason that it is necessary to give a certain minimum pitch or inclination to the sieve, which involves the separation of successive turns of the sieve to a greater distance than is necessary for the reception of the gather-boards and the proper travel of the material under treatment. It will be seen that where such unnecessary space exists it is entirely feasible to introduce an extra screen or sieve, or in some cases more than one extra sieve, thus utilizing to the utmost the space within the chest or casing.

Having thus described my invention, what I claim is—

1. In a sifting-machine, the combination of a central tubular trunk, provided with a lateral outlet for escape of material; a sieve winding spirally about said trunk from an upper to a lower level; and means substantially such as described and shown for imparting bodily horizontal motion to the sieve and trunk in a circular path.

2. In a sifting-machine, the combination of a tubular trunk; a sieve winding spirally about said trunk; a board or stop extending across the sieve; and an opening through the trunk in rear of said board, whereby the material is directed from the sieve-surface into the trunk.

3. In a sifting-machine, the combination of a central tubular trunk; a sieve winding spirally about said trunk; a diaphragm extending across the trunk; an opening above said diaphragm through which material may pass from the trunk to the sieve; a board or stop extending across the sieve-surface and serving to limit the travel of material upon its surface, and an opening through the trunk below the diaphragm and above or in rear of the stop-board, whereby material is enabled to pass from the sieve-surface into the trunk.

4. In a sifting-machine, the combination of a central trunk having independent longitudinal passages or compartments; a feed-box at the upper end of the trunk provided with compartments corresponding with those of the trunk; and a sieve winding spirally about the trunk below the feed-box, said trunk being provided with lateral openings for the passage of material from its compartments to the sieve.

5. In a sifting-machine, the combination of a central trunk having independent longitudinal passages or compartments; a feed-box at the upper end of the trunk provided with compartments corresponding with those of the trunk; and a sieve winding spirally about the trunk below the feed-box, said trunk being provided with lateral openings for the passage of material from the sieve into the trunk.

6. In a sifting-machine, the combination of a feed-box divided into compartments; a central trunk extending downward from the feed-box and similarly divided; a discharge-box at the lower end of the trunk provided with compartments corresponding and communicating with those of the trunk; diaphragms extending across the compartments of the trunk; a sieve winding spirally about said trunk; lateral openings through the walls of the trunk above and below the diaphragms, and boards or stops extending across the sieve immediately below the lower openings of the trunk, substantially as and for the purpose explained.

7. In a sifting-machine, the combination of a chest or casing; a central column; a sieve winding spirally about said column; gather-boards or carriers beneath said sieve; flights or blades applied to the upper surface of the sieve and serving to loosen and to distribute material over its surface; and means for imparting to the chest or casing a horizontal movement in a circular path.

8. In a sifting-machine substantially such as described, the combination of a spirally-inclined sieve; a series of flights or blades projecting upward from the face thereof; and means for imparting to the sieve a horizontal movement in a circular path.

9. In a sifting-machine, the combination of a central trunk, a sieve winding spirally about said trunk; and delivery chutes or spouts extending downward within said trunk and having openings at different levels to deliver material upon different portions of the sieve.

10. In a sifting-machine, a sifting chest or body comprising an upper feed-box $a$; a lower discharge-box $b$; an intermediate trunk $c$; a central pipe $j$; and partitions dividing the feed and discharge chambers and the trunk into compartments and extending inward to the central pipe, substantially as shown.

11. In a sifting-machine, a sieve-support comprising an elevated feed-box $a$; a tubular trunk $c$ extending downward from said feed-box; a discharge-box at the lower end of the trunk; and partitions dividing the trunk and the boxes into compartments.

12. The herein-described sifting-machine consisting of a frame A; a chest or body B; hangers C carried at their upper ends by the frame and supporting the chest at their lower ends; a feed-box $a$ at the upper end of the chest; a trunk $c$ extending downward from the feed-box; a discharge-box $b$ at the lower end of the trunk; partitions dividing the feed and discharge boxes and the trunk into compartments; a sieve winding spirally about the trunk; a casing or jacket inclosing the sieve; inlet and exit openings through the walls of the trunk; stop-boards extending across the sieve below the exit-openings; and means substantially such as described for imparting a horizontal swinging motion to the chest B.

13. In a sifting-machine, the combination of a central tubular column provided with lateral openings; and two or more continuous spiral screens or sieves winding about said column after the manner of a double screw-thread and each arranged to receive stock through the lateral openings of the central column.

14. In a sifting-machine, the combination of a tubular central column provided with lateral openings; two or more continuous spiral sieves or screens winding about said column after the manner of a double screw-thread; and gather-boards or carriers similarly arranged, one beneath each sieve, the sieves being arranged to receive stock through the lateral openings of the trunk.

15. In a sifting-machine, the combination of a sieve in the form of a spiral inclined plane; flights or blades rising from the surface of said sieve at approximately right angles to the radii of the sieve; and means, substantially such as described, for bodily moving the sieve horizontally, in a circular path, all substantially as set forth.

16. In a sifting-machine, the combination of a central column; arms extending therefrom; sieve-sections extending from arm to arm and supported thereby, and flights or blades adjustably secured to said arms between the sieve-sections, substantially as described and shown.

17. In a sifting-machine, the combination of a central support, a series of radial arms; sieve frames or sections adapted to be inserted and removed into and from the spaces between the arms; and flights or blades secured to said arms, whereby the sieve-sections may be withdrawn and replaced without disturbing said flights.

18. In a sifting-machine, the combination of a spirally-arranged sieve having a continuous smooth upper face; and a series of flights or blades applied to said face at intervals to distribute and shake or loosen the stock.

19. In a sifting-machine, the combination of a central trunk containing feed and delivery passages; a sieve winding spirally about said trunk; and a discharge-box at the lower end of the trunk and communicating therewith.

20. In a sifting-machine of the character described, the combination of a central column containing vertical passages; a gather-box at the lower end of said column divided into compartments and communicating with the passages of the trunk; a sieve winding spirally about the trunk; and openings through the walls of the trunk, whereby material may pass from the sieve into the trunk and thence to the gather-box.

21. In a sifting-machine of the character described, the combination of a central trunk or column containing upright passages; diaphragms extending across said passages; feed-openings formed through the walls of the trunk above, and discharge-openings formed through the walls of the trunk below said diaphragms; a gather or discharge box at the foot of the trunk having compartments corresponding and communicating with the passages of the trunk; and a sieve winding spirally about the trunk, substantially as described and shown.

In witness whereof I hereunto set my hand in the presence of two witnesses.

WILLIAM D. GRAY.

Witnesses:
WM. BANNEN,
FRANK W. GREENLEAF.